Feb. 7, 1933.　　　O. B. ANDREWS　　　1,896,602
PACKAGE FOR SLICED BREAD
Filed Oct. 15, 1931　　2 Sheets-Sheet 1
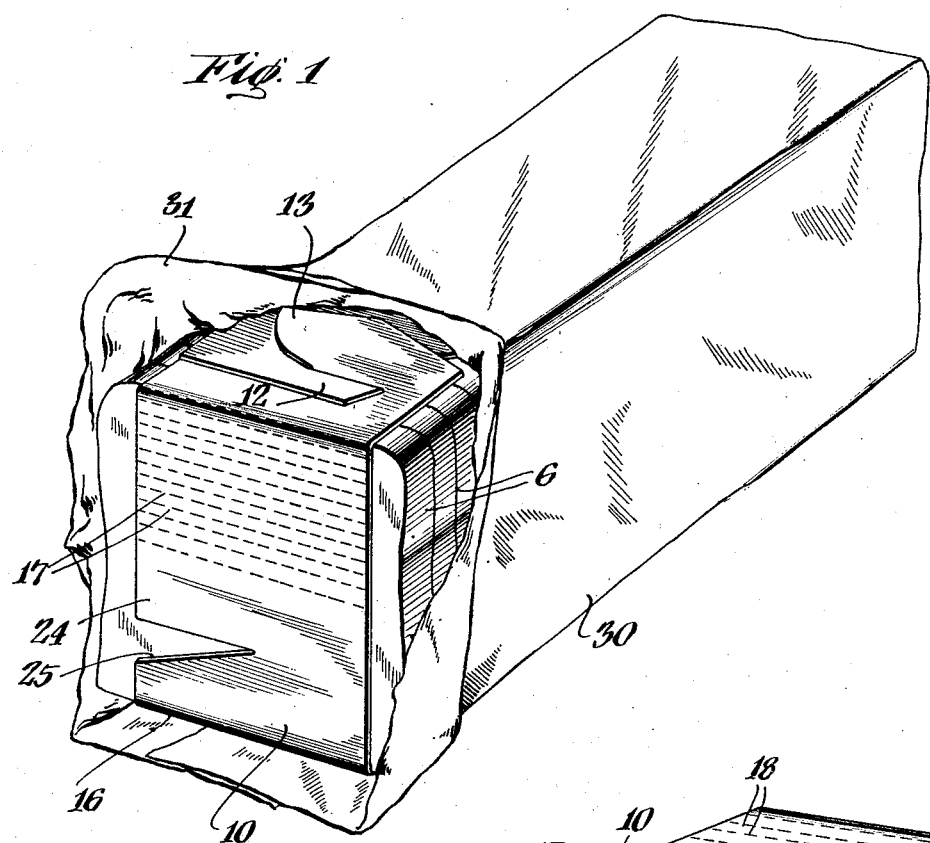
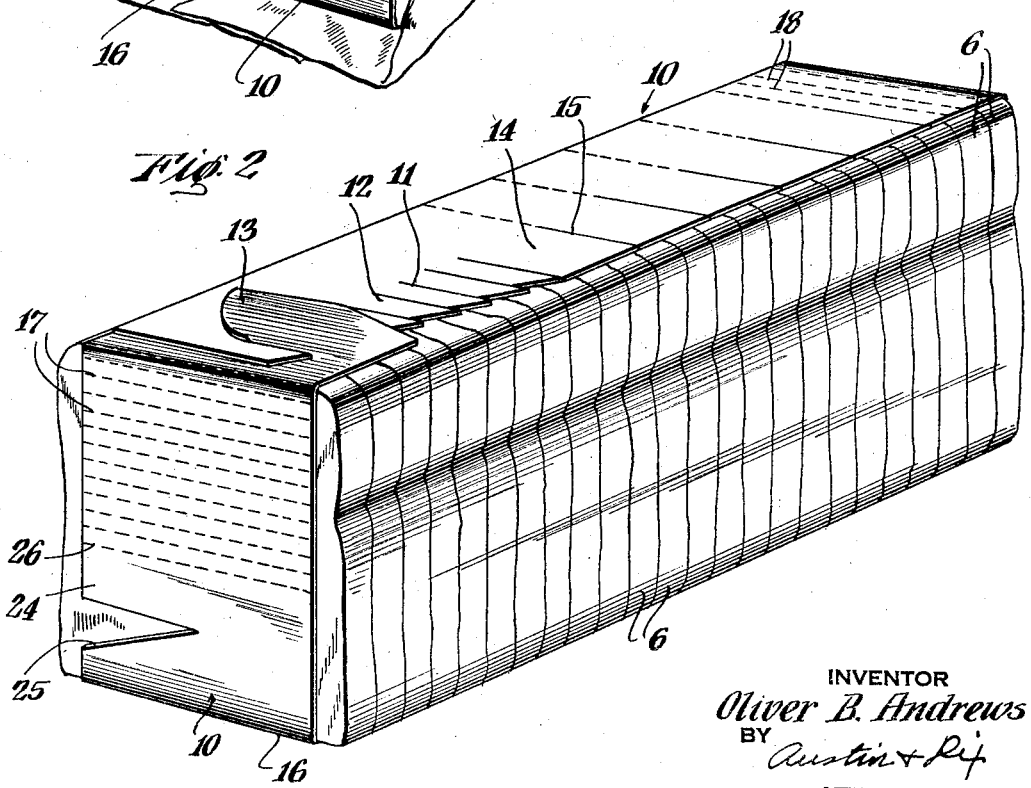
INVENTOR
Oliver B. Andrews
BY
ATTORNEYS Feb. 7, 1933.     O. B. ANDREWS     1,896,602
PACKAGE FOR SLICED BREAD
Filed Oct. 15, 1931     2 Sheets-Sheet 2
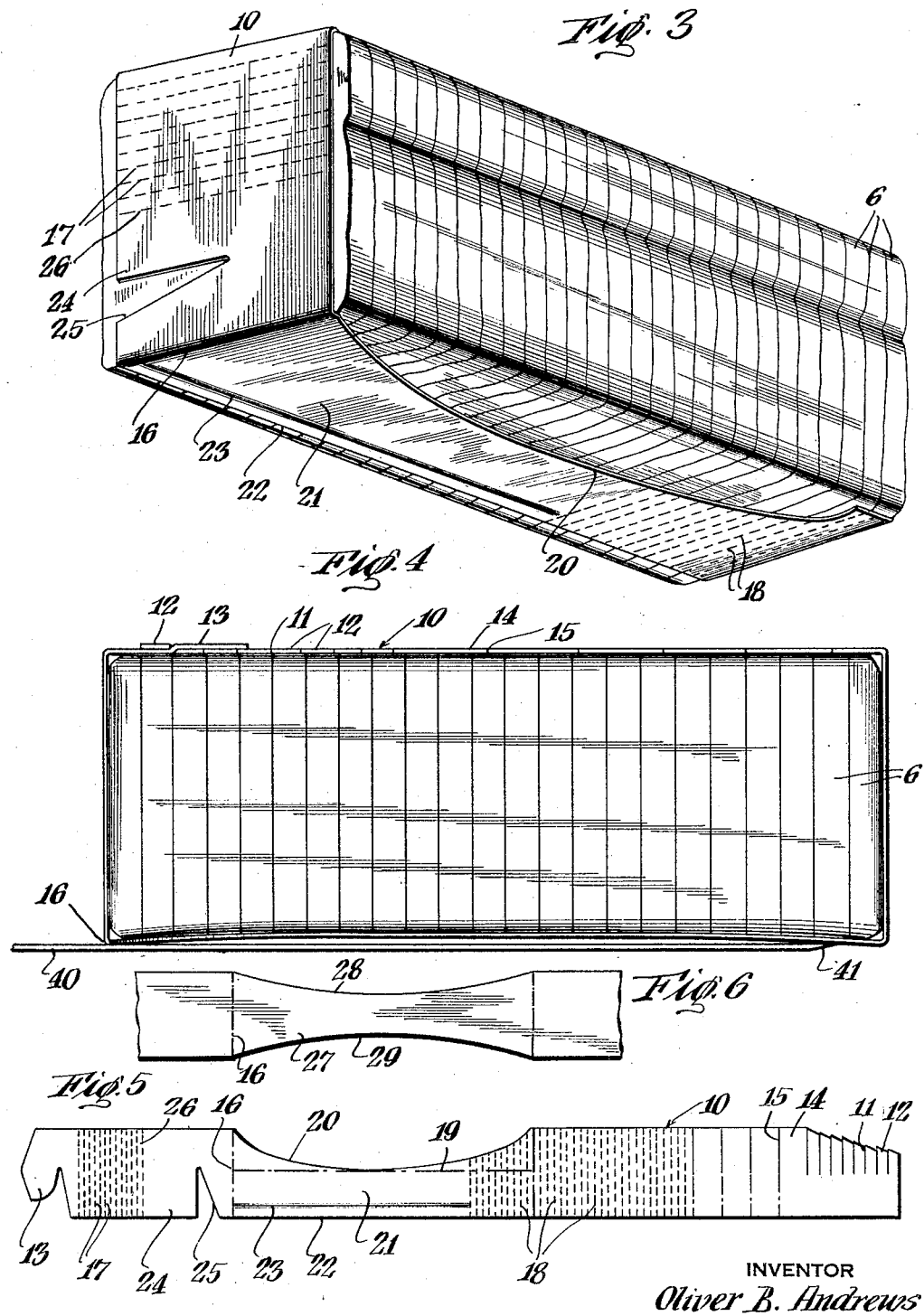

Patented Feb. 7, 1933

1,896,602

UNITED STATES PATENT OFFICE

OLIVER B. ANDREWS, OF CHATTANOOGA, TENNESSEE

PACKAGE FOR SLICED BREAD

Application filed October 15, 1931. Serial No. 568,893.

This invention relates to a package for sliced bread adapted to hold the sliced loaf substantially in its original form and maintain the same as a loaf while various slices are removed therefrom for use.

This application involves improvement over my copending application, Serial No. 535,109, filed May 5, 1931, and my copending application, Serial No. 538,450, filed May 19, 1931.

An objection often raised against bread bands now on the market is that in order to release the band from the sliced bread to obtain a few slices of bread, it is necessary to practically remove the waxed sealed wrapper from the entire sliced loaf. It is evident that the wax wrapper serves a very useful purpose in keeping the bread clean and preventing the moisture and freshness from escaping from the bread, and this wrapper should not be disturbed any more than necessary as the slices are removed.

It has also been difficult to place the sealing wrapper on a loaf of sliced bread by means of automatic wrapping machines when the loaf is bound together by bands now generally in use, due to the obstruction which the band furnishes to certain elements of the machine. In the Hayssen wrapping machine and other well known wrapping machines, for example, there is an arm which slides under the loaf of bread during the wrapping process. Bands now in use often sag out of contact with the bottom of the loaf and then often become entangled with the operating arm of the wrapping machine. The result is that the band is torn and the machine must be stopped and the loaf removed before the wrapping operation can again proceed.

An object of my invention is to provide a package for a loaf of sliced bread which is adapted to be unsealed at one end to permit slices to be removed from that end without disturbing or exposing the remaining slices to the air, and which can thereafter be easily and quickly repacked and closed to protect and keep fresh the remaining slices of bread.

Another object of my invention is to provide a bread band which tightly hugs the bottom of the loaf and tightly conforms to the loaf contour, which band is adjustable to tightly fit the loaf after slices have been removed, which holds the slices in perfect loaf form and in close contact one with the other, which in no way interferes with the moving elements of the wrapping machine, and which can be easily and economically made of inexpensive materials and quickly and effectively applied to the sliced loaves by the baker.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out may be better understood by referring to the following description in which certain specific disclosures are made for purpose of explanation.

Fig. 1 is a perspective view of my complete package for sliced bread, one end of the wrapper being open to more clearly show the bread band underneath;

Fig. 2 is a perspective view showing the bread band as it appears from the top when wrapped around a loaf of bread;

Fig. 3 is a perspective view showing my bread band as it appears from the bottom when wrapped around a loaf of bread;

Fig. 4 is a side view of the bread band as it appears wrapped around a loaf of bread;

Fig. 5 is a face view of my bread band as it appears when extended; and

Fig. 6 is a fragmentary face view of a bread band of somewhat modified construction.

Like reference characters denote like parts in the several figures of the drawings.

I have shown in the drawings a loaf of sliced bread composed of slices 6 in alignment. My bread band 10 adapted to surround the slices is composed of a strip of fiber or paper board material having a plurality of slots 11 at one end thereof. The slots extend from one edge to substantially the center of the band, and form tongues 12 therebetween. These tongues may be tapered at their ends, as clearly shown in Fig. 5. The other end of the band is provided with a hook portion 13 which is adapted to interlockingly engage with any one of the tongues 12 at the other end of the band when the band is wrapped around the sliced loaf. To permit further adjustability after some of the slices have been removed from the loaf, I provide additional tongues 14 separated by slots or cuts 15, as clearly shown in Fig. 5. The slots 15 may be spaced apart a greater distance than the slots 11, if so desired.

In packaging the sliced loaf, the edge of the loaf is placed adjacent to a master score line 16 and the left end portion of the band, as shown in Fig. 5, is raised and placed against the vertical face of the slice. Score lines 17, spaced approximately 1/8 of an inch apart, are provided, which permit the hook end portion of the band to extend around and lie flat against the upper edge of the end slice. Due to variance in moisture content and other reasons, it is well known that loaves of bread differ in thickness, in spite of the fact that they may contain substantially the same weight of raw dough. The closely spaced score lines 17 accommodate my band to loaves of various thicknesses.

The other end of my band is also provided with a series of score lines 18 which extend substantially from the last of the tongues 14 to the approximate midsection of the band. The closely spaced score lines 18 permit the band to fit snugly over the end of the sliced loaf regardless of the length and thickness of the loaf, or the number of slices which have been removed.

Loaves of bread sold by commercial bakers are generally wrapped with a waxed or paraffin wrapper applied by an automatic wrapping machine. Substantially all of the wrapping machines in general use are provided with an arm 40 having an edge 41 which slides along the sides or bottom of the loaf during the wrapping operation. Bread bands heretofore used all have a tendency to separate or sag away from the sides of the loaf after the band has been applied. When this occurs, the edge 41 of the operating arm 40 often slips between the bottom or side of the load and the bread band, with the result that the band is torn or misadjusted and the slices are thrown out of alignment or actually injured. The bread band which I disclose in this application positively prevents such an occurrence, since the band is so made that the bottom portion thereof, along which the operating blade 40 moves, is so constructed that it tightly presses or hugs against the bottom of the loaf so that the blade edge 41 of the operating arm will not pass between the band and the loaf.

It is seen that when my bread band is wrapped around the loaf and the hook portion 13 interlocked with one of the tongues 12, that a line of increased pull or stress 19 is developed in the band whose position is determined by and which flows from the point of load contact between the hook portion 13 and the tongue 12. When the slots 11 extend substantially to the center line of the band and the hook 13 is properly adjusted in interlocking engagement with a tongue 12, this line of increased stress would be found substantially along the longitudinal center of the band, as indicated at 19 in Figure 5. This line of increased stress tends to force all parts of the band into close contact with the loaf unless interfered with by other parts of the band.

I provide an arcuate cut 20 in the band which in width extends from the side edge of the band to substantially the line of increased stress 19. Longitudinally arcuate portion 20 extends substantially across the entire length of the loaf bottom. The line of increased stress 19 appears to force the arcuate edge 20 into close contact with the bottom of the loaf. But whatever the theory may be, with a band thus cut, it is a proven fact that the arcuate cutout portion 20 of such a band hugs against the underside of the loaf with the greatest tenacity, and to such an extent that the underside of the loaf is actually slightly concaved by the pressure of the band thereagainst, as indicated in Figure 4.

I have also found that the opposite side edge 22 of the band may be caused to tightly hug the bottom of the loaf by providing a longitudinally extending crimp therein extending longitudinally along the side edge. Whether this crimp actually shortens the side edge 22 of the band and therefore causes the side edge to seat tightly against the loaf, is not definitely known, but it has been demonstrated that the edge 22 does sit close against the loaf when a longitudinal crimp 23 is provided. My bread band as thus constructed seats so tightly against the bottom of the loaf that any possibility of the edge 41 of the operating arm 40 becoming entangled with the bread band is entirely removed. My bread band as thus constructed, is economically adapted for automatic wrapping machine operation.

I have shown in Figure 6 a possible further modification in which the bottom portion 27 of the bread band has arcuate cutouts 28 and 29 on both sides thereof. This type of bread band will also adhere tightly to the bottom of the loaf overcoming the difficulty encountered during the machine wrapping operation.

My sliced bread package is completed by placing the sliced loaf having the bread band surrounding the same in a waxed wrapper 30 which may be made generally of tubular form. The end flaps 31 of the wrapper are sealed tightly over each end of the loaf. When one or more slices of bread are to be removed, the flaps 31 of the wrapper are separated so as to expose only one end of the loaf. The master score line 16, against which the edge of the loaf seats, defines the location of the hook portion 13 in such a way that the hook portion rests substantially on the end shoulder of the loaf, as clearly shown in Figures 1 and 2. With the hook portion thus positioned, it is easy for the housewife to disengage the same from the tongue 12 by merely opening one end of the wrapper only, as shown in Fig. 1. The remaining portion of the wrapper is thus not disturbed and the remaining slices of the loaf are preserved in a fresh, clean and sanitary condition.

My band is so constructed as to permit adjustment to hold closely together a few slices which may remain in the package. To shorten the band so that it can be interlocked around a few slices, I provide a second hook portion 24 formed by cutting a notch 25 in the edge of the band, as clearly shown in Figure 5. By tearing off the hook portion 13 along the line 26, the second hook portion 24 may be used to engage tongues 12 or 14, thus greatly shortening the band so that it will firmly and tightly hold together a few slices only. It is understood that my band can be made of a number of different lengths to accommodate the particular loaves made by bakers.

The master score line 16 not only operates to define the position of the hook portion 13 on the shoulder of the loaf, but serves as a mark to show the baker where one end of his loaf should be placed. Banding and wrapping of the loaf is thus greatly facilitated.

It is understood that my adjustable band is applicable to the packaging of other bakery products, such as rolls, cakes, and cookies, and I do not limit the application of my band to sliced bread alone.

While certain novel features of the invention have been disclosed and are pointed out in the annexed claims, it will be understood that various omissions, substitutions and changes may be made by those skilled in the art without departing from the spirit of the invention.

What is claimed is:

1. A band for sliced bread adapted to surround the slices to maintain the same in loaf assembled form, said band having adjustable interlocking means at each end thereof, said interlocking means being arranged to deliver an increased line of stress longitudinally along said band, said band having cutout portions along the sides where the band has a tendency to sag away from the loaf, said cutout portions extending from the free edge of the band to the vicinity of said line of increased stress.

2. A band for sliced bread adapted to surround the slices to maintain the same in loaf assembled form, said band having adjustable interlocking means at each end thereof, said band having cutout portions along the sides at points where the band has a tendency to sag away from the loaf.

3. A band for sliced bread adapted to surround the slices to maintain the same in loaf assembled form, said band having adjustable interlocking means at each end thereof, said band having cutout portions along the sides at points where the band has a tendency to sag away from the loaf, said cutout portions extending from the free edge of the band approximately to the center line thereof.

4. A band for sliced bread adapted to encircle the slices to maintain the same in loaf assembled form, said band having a loaf supporting portion intermediate the ends thereof, means for securing the ends together and means formed with said loaf supporting portion adapted to force the edges of the portion tightly against the loaf when the band is applied to the loaf.

5. A band for sliced bread adapted to encircle the slices to maintain the same in loaf assembled form, said band having a loaf supporting portion intermediate the ends thereof, means for securing the ends together, said band having means on one side of the loaf supporting portion adapted to force that side of the band to seat tightly against the loaf, when the band is applied to the loaf.

6. A band for sliced bread adapted to encircle the slices to maintain the same in loaf assembled form, said band having a loaf supporting portion intermediate the ends thereof, means for securing the ends together, said band having means adjacent one edge of the loaf supporting portion adapted to force that edge tightly against the loaf, when the band is applied to the loaf.

7. A band for sliced bread adapted to encircle the slices to maintain the same in loaf form, said band having a loaf supporting portion intermediate the ends thereof, means for securing the ends together, and a crimp formed adjacent one edge of the loaf supporting portion and adapted to force that edge tightly against the loaf, when the band is applied to the loaf.

8. A band for sliced bread adapted to encircle the slices to maintain the same in loaf form, said band having a loaf supporting portion intermediate the ends thereof, means for securing the ends together, and a cutout portion in one side of the loaf supporting portion adapted to force that side tightly against the loaf, when the band is applied to the loaf.

9. A band for sliced bread adapted to encircle the slices to maintain the same in loaf form, said band having a loaf supporting portion intermediate the ends thereof, means for securing the ends together, a crimp formed adjacent one edge of the loaf supporting portion and a cutout portion in the other side of the loaf supporting portion, said crimp and cutout being adapted to force the edges of the loaf supporting portion tightly against the loaf, when the band is applied to the loaf.

10. A band for sliced bread adapted to encircle the slices to maintain the same in loaf form, comprising a strip of flexible paper board, having a plurality of spaced slots at one end thereof and forming tongues therebetween, a hook portion at the other end of the band adapted to adjustably engage said tongues, said strip including a loaf supporting portion intermediate the ends of the band, means formed with said loaf supporting portion adapted to force the edges of the portion tightly against the loaf when the band is applied to the loaf and a master score line defining one end of the loaf supporting portion, said score line being positioned with respect to the end of the band having the hook portion formed thereon, that the hook will extend a short distance beyond the top edge of the loaf when the band is applied to the slices to permit removal of the slices by opening one end of the package only.

11. A band for sliced bread adapted to encircle the slices to maintain the same in loaf form, comprising a strip of flexible paper board having a plurality of spaced slots at one end thereof and forming tongues therebetween, a hook portion at the other end of the band adapted to adjustably engage said tongues, said strip including a longitudinally adjustable loaf supporting portion defined by a plurality of score lines, intermediate the ends of the band and transverse thereof, means on one side of the loaf supporting portion adapted to force that side of the band to seat tightly against the loaf, when the band is applied to the loaf and means to locate the hook at one end of the loaf when the band is placed around the loaf, comprising a master score line near the hook end of the band and spaced therefrom so that a predetermined portion of the band, between the master score line and the locking means formed on that end of the band, extends a short distance beyond the top edge of an end slice, so as to permit removal of the slices by opening one end of the package only.

12. A band for sliced bread adapted to surround the slices to maintain the same in loaf assembled form, said band having adjustable interlocking means at each end thereof, the interlocking means being arranged to deliver an increased line of stress longitudinally of the band, said band having a cutout portion and a crimp formed on either side of the line of increased stress in that portion of the band which has a tendency to sag away from the loaf when the band is under tension and applied to the loaf.

In testimony whereof I have hereunto set my hand.

OLIVER B. ANDREWS.